United States Patent
Dong et al.

(10) Patent No.: US 12,436,312 B2
(45) Date of Patent: Oct. 7, 2025

(54) METHOD FOR MEASURING FLOW VELOCITY OF MULTILAYER GROUNDWATER USING DISTRIBUTED OPTICAL FIBER WITH POINT-SOURCE ACTIVE HEATING

(71) Applicant: Institute of Geology and Geophysics, Chinese Academy of Sciences, Beijing (CN)

(72) Inventors: Yanhui Dong, Beijing (CN); Huaqing Qin, Beijing (CN); Liheng Wang, Beijing (CN)

( * ) Notice: Subject to any disclaimer, the term of this patent is extended or adjusted under 35 U.S.C. 154(b) by 0 days.

(21) Appl. No.: 19/185,716

(22) Filed: Apr. 22, 2025

(65) Prior Publication Data
US 2025/0251525 A1    Aug. 7, 2025

(30) Foreign Application Priority Data
Apr. 26, 2024   (CN) .......................... 202410520006.5

(51) Int. Cl.
*G01V 9/00*    (2006.01)

(52) U.S. Cl.
CPC .................................... *G01V 9/005* (2013.01)

(58) Field of Classification Search
CPC .......... G01P 5/26; G01F 1/688; G01F 1/6884; G01K 11/32; G06F 18/10; G06F 18/20
See application file for complete search history.

(56) References Cited

U.S. PATENT DOCUMENTS

| | | | |
|---|---|---|---|
| 10,738,594 B2 * | 8/2020 | Duan | E21B 47/135 |
| 2008/0065362 A1 * | 3/2008 | Lee | G01F 1/74 703/10 |

(Continued)

FOREIGN PATENT DOCUMENTS

| | | | | |
|---|---|---|---|---|
| CN | 112179814 A | * | 1/2021 | ............ G01M 10/00 |
| CN | 115128298 A | * | 9/2022 | ......... G01K 11/3206 |

(Continued)

OTHER PUBLICATIONS

Zhang et al. " Estimation of Groundwater Flow Rate by an Actively Heated Fiber Optics Based Thermal Response Test in a Grouted Borehole", 2022 (Year: 2022).*

(Continued)

*Primary Examiner* — Eyob Hagos
(74) *Attorney, Agent, or Firm* — Addison D. Ault; IPGentleman Intellectual Property Services, LLC (57) ABSTRACT

The present disclosure provides a method for measuring flow velocity of multilayer groundwater using distributed optical fiber with point-source active heating, comprising: setting and optimizing field test parameters; conducting a background temperature monitoring test; performing a point-source active heating distributed temperature measurement test, including conducting multiple rounds of heating tests; denoising the obtained multi-point source thermal plume attenuation signal data of the groundwater; searching for the peak value of temperature-permeability curve based on an automatic multi-scale peak search algorithm; performing secondary processing on the peak data; estimating the groundwater flow velocity. The method of the present disclosure solves the problem that the existing groundwater flow velocity measurement technology cannot simultaneously measure multiple points and multiple layers, and it can avoid groundwater contamination during the measurement process.

7 Claims, 5 Drawing Sheets

(56) References Cited

U.S. PATENT DOCUMENTS

| | | | | |
|---|---|---|---|---|
| 2017/0067335 A1* | 3/2017 | Weng | ............... | E21B 47/10 |
| 2017/0260846 A1* | 9/2017 | Jin | ............... | E21B 47/113 |
| 2021/0388716 A1* | 12/2021 | Cerrahoglu | ............ | G01K 11/32 |
| 2024/0377599 A1* | 11/2024 | LeBlanc | ............... | G02B 6/443 |

FOREIGN PATENT DOCUMENTS

| | | | | | |
|---|---|---|---|---|---|
| CN | 116381273 A | * | 7/2023 | | |
| CN | 119437328 A | * | 2/2025 | | |
| DE | 102016203865 A1 | * | 9/2017 | ............ | E21B 47/06 |
| JP | 2007232597 A | * | 9/2007 | | |
| WO | WO-2024148852 A1 | * | 7/2024 | ............ | E21B 47/103 |

OTHER PUBLICATIONS

Drusova et al. "Comparison of three types of fiber optic sensors for temperature monitoring in a groundwater flow simulator", 2021 (Year: 2021).*

* cited by examiner

METHOD FOR MEASURING FLOW VELOCITY OF MULTILAYER GROUNDWATER USING DISTRIBUTED OPTICAL FIBER WITH POINT-SOURCE ACTIVE HEATING

CROSS-REFERENCE TO RELATED APPLICATION

This application claims the benefit of Chinese Patent Application No. CN202410520006.5 filed on Apr. 26, 2024 in China National Intellectual Property Administration, the whole disclosure of which is incorporated herein by reference.

TECHNICAL FIELD

The present disclosure relates to the field of geophysical technology, and relates to the field of "exploration or detection equipments or methods", specifically, to the "existence or measurement of flow velocity of groundwater" in "other or comprehensive exploration or detection", and especially to a method for measuring flow velocity of multilayer groundwater using distributed optical fiber with point-source active heating.

BACKGROUND

The flow rate and seepage velocity of groundwater are not only the key parameters for the rational development and pollution prevention of groundwater resources, but also the scientific basis for underground engineering construction and underground mineral resource exploitation. Therefore, how to accurately obtain these parameters has become a hot topic in the field of hydrogeological research.

The flow rate of groundwater is positively correlated with the flow velocity. At present, the flow velocity and flow direction test methods of groundwater are mainly divided into the following categories:

I. Point source tracer dilution method. This method injects tracers such as isotopes, fluorescent agents, sodium salts or deionized water into the borehole packer, observes the dilution process of the tracers in the groundwater, and thus detects the groundwater flow velocity.

II. Flowmeter. For example, electromagnetic flowmeters use the principle of electromagnetic induction to measure the flow rate of conductive fluid according to the electromotive force induced when the conductive fluid passes through an external magnetic field; rotor or impeller flowmeters place the rotor or impeller in the groundwater to be measured, and it rotates under the impact of groundwater flow, and the speed of the rotor or impeller rotation reflects the flow rate.

III. Optical method. For example, the colloidal borescope flowmeter takes pictures of the movement characteristics of colloid particles in groundwater to calculate the groundwater flow velocity and direction.

The above method has the following problems and disadvantages:

I. The above methods require the detection device/probe to be placed in the wellbore, and it can only detect the groundwater flow velocity at a certain point at a time. If it is necessary to detect the groundwater flow velocity at different depths or layers, it is necessary to raise or lower the probe to the target layer. Therefore, the temporal and spatial continuity of the measured data is poor, and the groundwater is greatly disturbed during the detection process, which increases the error of the measurement results.

II. As the methods in the prior art cannot measure multiple points at the same time, if it is necessary to accurately measure the groundwater flow velocity in a certain layer, it often requires to isolate the target layer of the wellbore. However, the cost of isolation test equipment is very high, and there is an impact of wellbore damage on groundwater flow velocity detection.

III. The tracer dilution method involves the introduction of substances that are not originally part of the groundwater, into the aquifer, which may cause environmental pollution.

SUMMARY

The object of the present disclosure is to at least partially overcome the defects of the prior art and provide a method for measuring flow velocity of multi-layer groundwater by using distributed optical fiber with point-source active heating.

The present disclosure also aims to provide a method for measuring flow velocity of multi-layer groundwater by using distributed optical fiber with point-source active heating, to solve the problem that existing groundwater flow velocity measurement technology cannot simultaneously measure multiple points and multiple layers.

The present disclosure also aims to provide a method for measuring flow velocity of multi-layer groundwater by using distributed optical fiber with point-source active heating, to improve the efficiency of groundwater flow velocity measurement.

The present disclosure also aims to provide a method for measuring flow velocity of multi-layer groundwater by using distributed optical fiber with point-source active heating, to avoid contamination of groundwater during the measurement process.

To achieve the above purposes or one of the purposes, the technical solution of the present disclosure is as follows:

A method for measuring flow velocity of multilayer groundwater using distributed optical fiber with point-source active heating, comprising:

Step S1: Setting and optimizing field test parameters;

Step S2: Conducting a background temperature monitoring test, comprising performing multiple rounds of temperature measurement tests; monitoring background temperature of a borehole along depth profile in each round of temperature measurement tests, with a monitoring time of more than 24 hours; and performing a quality check on the temperature measurement test data after each round of temperature measurement tests;

Step S3: Performing a point-source active heating distributed temperature measurement test, comprising performing multiple rounds of heating tests; in each round of heating tests, controlling a heating device controller (3) to turn on each electric heating unit (10) for a predetermined time, so that the temperature of each groundwater monitoring point rises to a predetermined temperature value, then turning off each electric heating unit (10); and stopping monitoring when the temperature of each groundwater monitoring point returns to the background temperature; and performing a quality check on the temperature measurement test data after each round of heating tests;

Step S4: Denoising multipoint-source thermal plume attenuation signal data of the groundwater obtained in Step 3;

S4.1 Original signal data trimming and conversion

S4.1.1 For the obtained multipoint-source thermal plume attenuation signal data of the groundwater, first, determine a depth range and depth interval of valid data based on a defined apex and end point, meanwhile, select appropriate temperature data recording frequency and determine a time interval for data recording based on research needs;

S4.1.2 Use the determined depth range to segment the original data, and select and obtain the required temperature data according to the determined time interval; assuming that X is a given two-dimensional multi-point source thermal plume attenuation signal data of the groundwater, with a depth range L of [0, M], a time range T of [0, N], then the temperature data X is a two-dimensional array of shape N×M, $X=\{x_{i,j}\}$, $i \in \{1, 2, \ldots, N\}$, $j \in \{1,2, \ldots, M\}$;

S4.1.3 Perform a transposition operation on the trimmed temperature data to obtain a two-dimensional array $X^T$ of shape M×N, $X^T=\{x_{i,j}\}$, $i \in \{1,2, \ldots, M\}$, $j \in \{1,2, \ldots, N\}$;

S4.2 Temperature data signal denoising

S4.2.1 Determine an appropriate cutoff frequency;

S4.2.2 Use a low-pass filter to perform low-pass filtering on the signal, wherein the low-pass filter retains low-frequency signals, that is, large-scale fluctuations in the data, and filters out high-frequency signals, that is, fast and small-scale fluctuations in the data; the commonly used low-pass filtering methods comprise moving average filters, exponential smoothing filters, Butterworth low-pass filters, and Chebyshev filters; for Butterworth filters, a relationship between amplitude and frequency of a nButterworth low-pass filter is expressed by the following formula:

$$|H(j\omega)| = \frac{1}{\sqrt{1+\left(\frac{\omega}{\omega_c}\right)^{2n}}},$$

where $|H(j\omega)|$ is amplitude of frequency response; $\omega$ is angular frequency; $\omega_c$ is cutoff frequency, which is a frequency point at which the filter begins to significantly attenuate the output signal; n is the order of the filter, the higher the order, the faster the filter attenuates near the cutoff frequency;

Step S5: Searching for a peak value of temperature-permeability curve based on an automatic multi-scale peak search algorithm;

S5.1 Construct a local maximum spectrum: assuming that x is a given univariate uniformly sampled signal containing a periodic or quasi-periodic peak; then first calculate the local maximum scan map;

S5.1.1 First, remove linear trend data from the signal x;

S5.1.2 Use a moving window method to find the local maximum value of signal x, the window size $W_k$ varies as $\{W_k=2k|k=1,2, \ldots, L\}$, where k is the k-th window of the signal, $L=[N/2]-1$, where $[N/2]$ is the upper limit function, taking the smallest integer not less than N/2; the expression of the local maximum $m_{k,i}$ is as follows:

$$m_{k,i} = \begin{cases} 0, & x_{i-1} > x_{i-k-1} \wedge x_{i-1} > x_{i+k-1} \\ r+\alpha, & \text{otherwise} \end{cases}$$

wherein $x_{i-k-1} \wedge x_{i-1}$ is the wedge product of $x_{i-k-1}$ and $x_{i-1}$; thus if x(t) is the local maximum value in the k window at time t, then $m_{k,i}=0$; otherwise $m_{k,i}=r+\alpha$; where r is a uniformly distributed random number in a range [0,1], and $\alpha$ is a constant factor ($\alpha=1$);

S5.1.3 Obtain a calculation result M of $M_{k,i}$, the matrix M is the local maximum spectrum (LMS), and all elements of the matrix M of shape L×N are within the range of [0,1+r];

$$M = \begin{pmatrix} m_{1,1} & m_{1,2} & \ldots & m_{1,N} \\ m_{2,1} & m_{2,2} & \ldots & m_{2,N} \\ \vdots & \vdots & \ddots & \vdots \\ m_{L,1} & m_{L,2} & \ldots & m_{L,N} \end{pmatrix} = (m_{k,i}),$$

S5.2 Sum the local maximum matrix;

S5.2.1 Sum each column of the matrix M, that is, for each time point t, calculate the sum of its local maximum marks at all K scales; the global minimum $\lambda=\text{argmin}$ ($\gamma_k$) of $\gamma=[\gamma_1,\gamma_2, \ldots, \gamma_L]$ represents the window with the most local maximum values; it gives a vector of the same length as the time series, in which each element represents the total number of times each time point is marked as non-maximum at all scales;

$$\gamma_k = \sum_{i=1}^{N} m_{k,i}, \text{ for } k \in \{1, 2, \ldots, L\};$$

S5.2.2 Use the $\gamma$ value obtained in the previous step to recalculate the LMS matrix M, delete all elements in $m_{k,i}$ that statisfy $k > \lambda$, and obtain a new $\lambda \times N_{matrix}$ $M_r=\{M_{k,i}\}$, $i \in \{1,2, \ldots, N\}$, $k \in \{1,2, \ldots, \lambda\}$;

S5.3 Calculate peak position;

the location of the peak is determined by finding the location where the vector value is 0 in the previous step;

S5.3.1 Calculate the column-wise standard deviation of the matrix $M_r$;

$$\sigma_i = \frac{1}{\lambda-1} \sum_{k=1}^{\lambda}\left[\left(m_{k,i} - \frac{1}{\lambda}\sum_{k=1}^{\lambda} m_{k,i}\right)^2\right]^{1/2}, \text{ for } i \in \{1, 2, \ldots, N\};$$

S5.3.2 Find all indices i where $\sigma_i=0$; store these values in a vector $P=[P_1, P_2, \ldots, P_{\hat{N}}]$, where $\hat{N}$ is the total number of detected peaks of signal x and P is the index of the detected peaks;

S5.4 Temperature-permeability curve peak data search;

S5.4.1 For all the data obtained by S4, change direction along the time interval t, for the temperature and depth data at a certain time point $t_i$, $i \in \{1,2, \ldots, N\}$, use the AMPD algorithm to search for the peak value, and obtain a vector $P_i=[P_1, P_2, \ldots, P_{\hat{M}}]_i$, where P is the index of the detected peaks, and the value of $\hat{M}$ is the number of measurement points;

S5.4.2 According to the obtained peak index $P_i$, multiply the corresponding index by the depth interval defined in S4.1.1 to obtain the depth data $r_i=[r_1, r_2, \ldots, r_{\hat{M}}]_i$ corresponding to the temperature peak point at a certain time point $t_i$, and store it in a one-dimensional array;

S5.4.3 Change direction along the time interval, use the AMPD algorithm to all the data, to obtain the three-dimensional data of the depth change of the temperature peak point at different times, let the data be a three-dimensional matrix R[t, p], t is the time, p is the measurement point corresponding to the temperature peak, $r_{ij}$ is the depth data corresponding to p, i∈{1,2, ..., N}, j∈{1,2, ..., M̂}.

$$R = \begin{bmatrix} r_{11} & \cdots & r_{1\hat{M}} \\ \vdots & \ddots & \vdots \\ r_{N1} & \cdots & r_{N\hat{M}} \end{bmatrix} = \{r_{i,j}\};$$

Step S6: Performing secondary processing on the peak data;

based on the two-dimensional data of temperature variation over time at different depths obtained by S5, perform linear regression outlier analysis on the temperature data at different depths and outlier detection of linear data;

S6.1 Regression model fitting: use ordinary least squares (OLS) to build a regression model for the temperature variation data at each depth over time; the OLS calculation process is as follows:

Assume that there are data points $(x_1, y_1), (x_2, y_2), \ldots, (x_n, y_n)$, where $x_1$ is an independent variable and $y_1$ is a dependent variable; the linear model is expressed as:

$$y = \beta_0 + \beta_1 x;$$

wherein $\beta_0$ and $\beta_1$ are model parameters; the goal of ordinary least squares is to minimize the sum of squared errors, that is:

$$S = \sum_{n=1}^{n} = (y_i - (\beta_0 + \beta_1 x_i))^2;$$

by taking partial derivatives with respect to $\beta_0$ and $\beta_1$ and setting them to 0, the optimal estimates of the two parameters are obtained;

S6.2 Calculate the studentized residuals for the established regression model:

$$r_i = \frac{e_i}{s_e \sqrt{1 - h_{ii}}};$$

where: $e_i$ is the residual of the i-th observation, i.e., $e_i = y_i - \hat{y}_i$; $s_e$ is the estimated standard deviation of the residual, $$\sqrt{\frac{\sum_{n=1}^{n} e_i}{n - p}},$$

where n is the sample size and p is the number of parameters in the model; $h_{ii}$ is the diagonal element of the hat matrix, reflecting the degree of influence of the i-th observation on its own predicted value;

S6.3 Outlier Identification: Values greater than 2 or 3 in the studentized residual calculation results are considered as outliers and the index of the data is recorded;

S6.4 Outlier processing: According to the index of the outliers identified in the previous step, assign a null value to the value corresponding to the index; then use a linear interpolation formula to process the null value, the linear interpolation formula is expressed as:

$$y = y_0 + \frac{(y_1 - y_0)}{(x_1 - x_0)} \cdot (x - x_0);$$

where: $x_1$, $x_0$ are the x-coordinates of the known points, $y_1$, $y_0$ are the y-coordinates of the known points, and x is the x-coordinate of the corresponding y-value you want to estimate;

after secondary processing, the depth variation data of the temperature peak points at different measurement points over time are obtained, a three-dimensional matrix R̂[t, p], t is the time, p is the measurement point corresponding to the temperature peak, and r̂ is the depth data corresponding to p, t∈{1,2, ..., i, ..., N}, p∈{1,2, ..., j, ..., M̂};

$$\hat{R} = \begin{bmatrix} \hat{r}_{11} & \cdots & \hat{r}_{1\hat{M}} \\ \vdots & \ddots & \vdots \\ \hat{r}_{N1} & \cdots & \hat{r}_{N\hat{M}} \end{bmatrix} = \{\hat{r}_{i,j}\};$$

Step S7: Estimating the groundwater flow velocity, using the ordinary least squares method to establish a one-dimensional linear regression model for the temperature variation data at each depth over time, and obtaining the estimated value of the groundwater flow velocity at the depth from the fitted regression model equation;

for the matrix R̂[t, p] obtained by S6.4, a one-dimensional linear regression model is established using the least squares method (OLS) for the two-dimensional data $p_j[t, \hat{r}]$ at a certain measurement point $p_j$;

assume there are data points $(t_1, \hat{r}_1), (t_2, \hat{r}_2), \ldots, (t_n, \hat{r}_n)$, where t is the independent variable and r̂ is the dependent variable; the linear model is expressed as:

$$\hat{r} = \beta_0 + \beta_1 t;$$

$\beta_0$ and $\beta_1$ are model parameters; the goal of ordinary least squares is to minimize the sum of squared errors, that is:

$$S = \sum_{n=1}^{n} (\hat{r}_i - (\beta_0 + \beta_1 t_i))^2;$$

by taking partial derivatives with respect to $\beta_0$ and $\beta_1$ and setting them to 0, the optimal estimates of the two parameters are obtained;

$\beta_1$ is the flow velocity at $p_j$, if its value is negative, then the flow velocity is upward, and if its value is positive, then the flow velocity is downward.

Cycle j to obtain the vertical velocity distribution of groundwater at different measuring points.

According to some embodiments of the present disclosure, step S1 comprises:

analyzing physical parameters of the borehole and core, comprising lithology distribution, thermal conductivity, porosity, specific heat capacity and permeability;

setting and optimizing parameters of a distributed optical fiber temperature measurement host (1).

According to some embodiments of the present disclosure, the step of setting and optimizing parameters of a distributed optical fiber temperature measurement host (1) comprises:

setting a monitoring length and heating point position of a temperature measuring optical fiber, and calibrating optical fiber refractive index parameters through a first water bath temperature calibration unit (5) and a second water bath temperature calibration unit (6);

testing a monitoring temperature resolution and temperature accuracy of the distributed optical fiber temperature measurement host (1), and calibrating and optimizing optical fiber attenuation coefficient, temperature sensitivity coefficient and temperature compensation value of the distributed optical fiber temperature measurement host (1) through the first water bath temperature calibration unit (5) and the second water bath temperature calibration unit (6);

performing test in borehole groundwater, and setting maximum temperature, duration, and power of the heating based on expected temperature response and safety criteria.

According to some embodiments of the present disclosure, after the background temperature monitoring test, all collected temperature data are corrected to ensure that the temperature measurement results at different depths and locations are coordinated with each other, and a background temperature-depth profile is produced to provide basic data for subsequent active heating distributed temperature measurement experiments.

According to some embodiments of the present disclosure, after the point-source active heating distributed temperature measurement test, the data collected by a downhole temperature measurement unit and a surface temperature measurement unit are compared with the standard temperature data, the deviation is adjusted, and the temperature data in the heating stage and the temperature data in the cooling stage are analyzed.

According to some embodiments of the present disclosure, step S4 comprises:

trimming and conversing the multi-point source thermal plume attenuation signal data of the groundwater;

denoising the distributed temperature data obtained from the test.

According to some embodiments of the present disclosure, step S5 comprises:

construct the local maximum spectrum;

sum the local maximum matrix;

calculate the peak position of the temperature-permeability curve.

According to some embodiments of the present disclosure, step S6 comprises:

Regression model fitting: using ordinary least squares method to build a regression model for the temperature variation data at each depth over time;

Calculating the studentized residuals for the established regression model;

Outlier identification: values greater than 2 or 3 in the studentized residual calculation results are considered as outliers, and the index of the data is recorded;

Outlier processing: according to the index of the identified outlier, the value corresponding to the index is assigned a null value, and then the null value is processed using a linear interpolation formula to obtain the temperature variation data over time at the depth corresponding to the peak temperature completed by the secondary processing.

According to some embodiments of the present disclosure, the method adopts a point-source active heating, composite optical cable, groundwater distributed optical fiber temperature measurement system.

The beneficial technical effects of the present disclosure are:

1. The current single-point flow velocity and direction detection technology requires the detection device/probe to be placed in the wellbore, and it can only detect the groundwater velocity at a certain local point at a time. If it is necessary to detect the groundwater velocity at different depths or layers, it must lift or lower the probe to the target layer. Therefore, the spatiotemporal continuity of the measured data is poor, and the disturbance to the groundwater is large during the detection process, which increases the error of the measurement result. The present disclosure adopts distributed optical fiber temperature measurement technology and multi-point source active heating, composite optical cable, it can measure the vertical flow velocity of groundwater in wellbores of different layers at one time, greatly improving the efficiency and cost of groundwater flow velocity measurement. Since the vertical flow velocity of groundwater at multiple points in the wellbore can be measured at one time, the location of the water-conducting or water-blocking fracture and the horizontal groundwater flow velocity at different depths can also be inferred by the changes in the vertical flow velocity of groundwater at different depths.

2. Many velocity testing methods, such as tracer dilution method, involve the introduction of substances that are not originally in the groundwater into the aquifer, which may cause environmental pollution. The present disclosure uses temperature signals to analyze groundwater velocity. Temperature is one of the properties of groundwater itself. Using temperature as a tracer to carry out velocity measurement will not cause environmental pollution, but also it is very easy to measure. In particular, after the introduction of DTS, high-precision, high temporal and spatial resolution and long-term continuous monitoring of groundwater temperature has been achieved, greatly improving the efficiency and accuracy of velocity measurement. The optical fiber can also be fixed in the wellbore for a long time for long-term monitoring at different depths, which is impossible with other velocity testing methods.

LIST OF REFERENCE NUMERALS

1 Distributed optical fiber temperature measurement host
2 Optical fiber Pigtail
3 Heating device controller
4 Cable
5. First water bath temperature calibration unit
6 Second water bath temperature calibration unit
7 Ground
8 Groundwater surface
9 Composite heating optical cable
10 Electric heating unit
11 Cable weight
12 Waterproof protective case
13 Optical fiber set
14 Load-bearing cable
15 Wire set
16 Temperature probe data transmission line
17 Filler.

DETAILED DESCRIPTION OF EMBODIMENTS

Exemplary embodiments of the present disclosure are described in detail below in conjunction with the accompanying drawings, wherein the same or similar reference numerals represent the same or similar elements. In addition, in the detailed description below, for ease of explanation, many specific details are set forth to provide a comprehensive understanding of the disclosed embodiments. However, it is apparent that one or more embodiments may also be implemented without these specific details. In other cases, known structures and devices are embodied in a schematic manner to simplify the accompanying drawings.

The present disclosure relates to hydrogeological exploration technology in geophysics, and utilizes distributed temperature measurement optical fiber technology to test groundwater temperature attenuation through point-source active heating composite optical cable, and analyze and estimate the vertical flow velocity and direction of groundwater. The present disclosure solves the problem that the existing groundwater flow velocity measurement technology cannot measure multiple points and multiple layers at the same time, and it specifically includes groundwater distributed optical fiber temperature measurement technology based on point-source active heating composite optical cable, and groundwater multi-point source thermal plume attenuation data processing technology and groundwater flow velocity estimation technology.

Groundwater flow rate is positively correlated with groundwater velocity. Groundwater velocity is a key parameter in hydrogeological research and an important scientific parameter for groundwater resource development, pollution prevention and control, underground engineering construction, and underground mineral resource exploitation. Current groundwater velocity measurement techniques such as point source tracer dilution method, flow meter, and optical flow meter can only detect velocity information at a certain point or section at a time. The spatiotemporal continuity of the measured data is poor, and the groundwater is greatly disturbed during the detection process, increasing the error of the measurement results.

During the groundwater seepage process, the temperature field and the seepage field interact and influence each other. There is a close coupling relationship between the two, so the flow of groundwater is bound to cause temperature field disturbance. The groundwater flow rate/velocity can be calculated by decoupling the seepage field and the temperature field based on the spatiotemporal variation of groundwater temperature. In recent years, distributed optical fiber temperature sensors (DTS) have achieved high-precision, high spatiotemporal resolution, and strong continuity of temperature monitoring. Due to its convenient measurement and cost-effectiveness, it has been widely used in fire detection, power grid monitoring, pipeline monitoring, oil and gas development and other fields.

Temperature signal is one of the properties of groundwater itself. Using temperature as a tracer to carry out flow velocity measurement will not cause environmental pollution, but also it is very easy to measure. In particular, after the introduction of DTS, high-precision, high-temporal and spatial resolution and long-term continuous monitoring of groundwater temperature has been achieved. However, natural groundwater temperature measurement cannot estimate groundwater flow velocity. The present disclosure uses temperature as a tracer and uses multi-point heating by electric heating to provide a "thermal tracer", which greatly increases the temperature signal amplitude, thereby using DTS to monitor the temperature signal change process in the wellbore to calculate the groundwater flow velocity. This method is simple, convenient, economical, and pollution-free. It can simultaneously measure the groundwater flow velocity at multiple points or multiple layers in the same wellbore in one measurement, reducing the disturbance attenuation of a single-point flow meter, and the calculated groundwater flow velocity has a wide range, which has a good application prospect.

The point source, active heating, distributed optical fiber method for measuring multi-layer groundwater flow rate and/or velocity of the present disclosure will be described in detail below in conjunction with specific embodiments.

Figure 1:
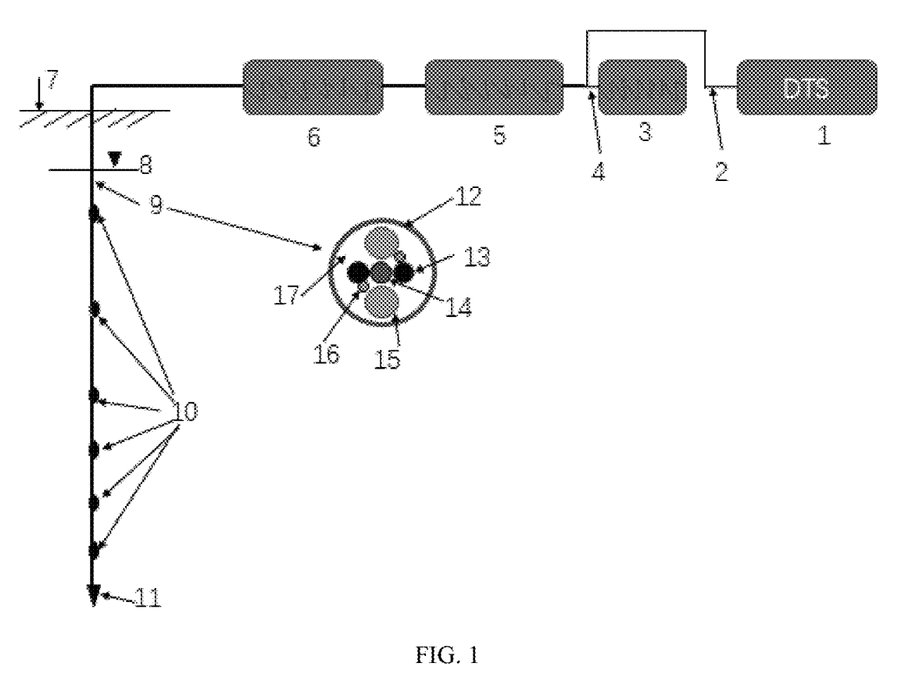
FIG. 1 is a schematic diagram of a groundwater distributed optical fiber temperature measurement system with a point-source active heating, composite optical cable according to an embodiment of the present disclosure.

(1) Point-Source Active Heating Composite Optical Cable Groundwater Distributed Optical Fiber Temperature Measurement System or Device The method for measuring groundwater flow velocity of the present disclosure adopts this point-source active heating composite optical cable groundwater distributed optical fiber temperature measurement system or device, and the system or device is introduced below. The system or device mainly includes a distributed optical fiber temperature measurement host 1, a heating device controller 3, a cable 4, a first water bath temperature calibration unit 5, a second water bath temperature calibration unit 6, a composite heating optical cable 9, an electric heating unit 10, and a cable weight 11.

Distributed optical fiber temperature measurement host 1 is a high-precision distributed optical fiber temperature measurement host. In order to accurately obtain flow velocity data, the basic parameters of the distributed optical fiber temperature measurement host (DTS) are required to be as follows: sensing distance of more than 1 km, temperature resolution equal to or better than 0.05° C., sampling interval equal to or better than 0.5 m, spatial resolution better than 1 m, temperature measurement range of −30-100° C., and temperature measurement accuracy of 0.15° C. or better.

The composite heating optical cable 9 extends into the groundwater surface 8 below the ground 7 (wellhead). The composite heating optical cable 9 is composed of a waterproof protective case 12, an optical fiber set 13, a load-bearing cable 14, a wire set 15, a temperature probe data transmission line 16 and a filler 17. The optical fiber set 13, the load-bearing cable 14, the wire set 15, the temperature probe data transmission line 16 and the filler 17 are arranged in the waterproof protective case 12. The optical fiber set 13 adopts a dual-fiber design, and two DTSs can be used for simultaneous monitoring to improve accuracy and stability. Multimode 62.5/125 or other types of optical fibers are used. In order to ensure the accuracy of temperature detection of the composite heating optical cable, bare optical fibers can be used. The load-bearing cable 14 is located at the center of the composite heating optical cable 9. The wire set 15 can be set accordingly according to the number and power of the set electric heating units to ensure the normal operation of one or more electric heating units. The temperature probe data transmission line 16 is a thermocouple temperature probe data transmission line in the heater (electric heating unit), which transmits the temperature data of the temperature probe back to the heating device controller 3. The filler 17 is arranged inside the waterproof protective case 12 and around each cable.

A plurality of electric heating units 10 are arranged along the composite heating optical cable 9, and the heating power of the electric heating unit 10 is set to 500-1000 W. Any number can be set according to the actual test environment and conditions, but it is necessary to ensure that the power supply can meet the requirements of starting the heaters at the same time. A cable weight 11 is arranged at the lower end of the composite heating optical cable 9.

Above the ground 7, the composite heating optical cable 9 is provided with a first water bath temperature calibration unit 5 and a second water bath temperature calibration unit. The first water bath temperature calibration unit 5 is a high-temperature water bath temperature calibration unit, which provides correction for the optical fiber temperature in the water bath unit by providing a constant temperature of more than 20 degrees. The second water bath temperature calibration unit 6 is a low-temperature water bath temperature calibration unit, which provides correction for the optical fiber temperature in the water bath unit by providing a constant temperature of 0 degrees. The composite heating optical cable 9 is connected to the heating device controller 3 through the cable 4. The heating device controller 3 is an intelligent controller, which has two functions. One is to control the start and stop of the point source heater, it can start all heaters at the same time, and can also start and stop some heaters according to the line setting; the second is to intelligently control the heating temperature by obtaining the temperature of the electric heating unit from the temperature probe data transmission line to ensure that the temperature of the electric heating unit does not exceed 70 degrees. The composite heating optical cable 9 is connected to the distributed optical fiber temperature measurement host 1 (DTS) through the optical fiber pigtail 2.

(2) Point-Source Active Heating Distributed Optical Fiber Temperature Measurement Test Technology S1 Field test parameter setting and optimization S1.1 On-site drilling data analysis S1.1.1 Analysis of drilling core data. Before temperature monitoring, it is necessary to first conduct a detailed analysis of the basic physical parameters of the drilling and core, including:

Lithology distribution: Identify rock types and sequence structures.

Thermal conductivity: Determine the ability of different rocks to conduct heat, which is important for assessing groundwater heat transfer.

Porosity: Calculate the volume ratio of voids in rock. Porosity directly affects the water storage capacity and permeability of rock.

Specific Heat Capacity: A measure of a rock's heat capacity per unit mass, which is a key parameter in assessing its thermal responsiveness.

Permeability coefficient: determines the permeability of rock to fluid and affects the efficiency of thermal fluid propagation in rock.

S1.2 DTS parameter setting and optimization

S1.2.1 Optimize the monitoring length and heating point position of the temperature measuring optical fiber. According to the core data analysis results and the actual drilling geological conditions, set the appropriate total length of the optical fiber to ensure coverage of the key monitoring area. Ensure that the heating point is located at the fracture, broken zone or other key sections of concern in the borehole, so that it is located at a location with large changes in heat conduction and heat capacity, so as to accurately capture temperature changes. Calibrate the optical fiber refractive index parameter through the high-temperature water bath temperature calibration unit, the low-temperature water bath temperature calibration unit and other temperature calibration/correction points.

S1.2.2 Temperature resolution and temperature accuracy test of temperature measurement fiber DTS monitoring. Temperature resolution: Test the temperature resolution of the DTS system under different conditions to ensure that it can capture subtle temperature changes. Temperature accuracy: Calibrate the DTS system through a standard temperature source to verify its temperature accuracy during the actual monitoring process and ensure data reliability. Calibrate and optimize DTS related parameters such as fiber attenuation coefficient, temperature sensitivity coefficient, temperature compensation value, etc. through a high-temperature water bath temperature calibration unit, a low-temperature water bath temperature calibration unit, and other temperature calibration points.

S1.2.3 Optimization of heating test parameters. Tests are conducted in borehole groundwater, and the maximum temperature and duration of heating as well as the heating power are set based on the expected temperature response and safety standards.

S2 Background temperature monitoring test

S2.1 DTS parameter optimization

S2.1.1 Test circuit design and on-site equipment testing, including circuit connection debugging, power supply equipment (generator, battery, etc.) power testing, etc. Ensure that all equipment is connected correctly, check the connectivity and stability of power supply equipment (such as generator, battery), and perform power testing to verify that they can provide continuous and stable power supply.

S2.1.2 DTS optical fiber on-site layout and testing. Repeat the DTS parameter setting and optimization of S1.2, check and debug the optical fiber temperature measurement accuracy and parameters, and calibrate the DTS temperature measurement system, including the calibration of the length of the optical fiber to be monitored underground, the calibration of the surface temperature calibration length, and the calibration of the position of the underground temperature probe.

S2.2 Formal background temperature measurement test

S2.2.1 The first round of temperature measurement test: Start DTS to monitor the borehole background temperature-depth profile. The monitoring time should be more than 24 hours.

S2.2.2 Perform data quality check of the first round of temperature measurement test to ensure data integrity and quality.

S2.2.3 Repeat steps S2.2.1 and S2.2.2 and perform 2-3 background temperature measurements to grasp the overall temperature change characteristics.

S2.3 Post-experiment processing and data integration analysis

S2.3.1 Temperature data calibration between downhole temperature measuring unit and surface temperature measuring unit. All collected temperature data shall be calibrated to ensure that the temperature measurement results at different depths and locations are coordinated with each other.

S2.3.2 Wellbore temperature-depth monitoring profile analysis: Integrate and analyze all monitoring data to produce a temperature-depth profile diagram to provide basic data for subsequent active heating tests.

S3 A-DTS (Active—distributed temperature sensing) test based on point Heating

S3.1 Preliminary test

S3.1.1 Repeat S2.1 to design the test circuit and conduct on-site equipment testing, including circuit connection debugging, power test of power supply equipment (generator, battery, etc.), DTS optical fiber on-site layout and testing, including calibration of downhole optical fiber length to be monitored, calibration of surface temperature calibration length, calibration of downhole temperature calibration unit position, inspection and debugging of optical fiber temperature measurement accuracy and parameters, and calibration of DTS temperature measurement system.

S3.1.2 Downhole point heating maximum heating power test, maximum heating temperature test, optimization and adjustment of heating parameter settings S3.2 Formal temperature measurement test S3.2.1 Background temperature monitoring, turn on DTS to start monitoring, and select the appropriate background monitoring time based on the background temperature measurement results in S2.3, it should generally be greater than 6 hours.

S3.2.2 The first round of heating test: Turn on the intelligent controller of the heating device (heating device controller), and according to the results of S3.1.2, turn on the heating unit for a suitable time, so that the temperature of each groundwater monitoring point rises by about 15 degrees. Then turn off the heater and stop DTS monitoring when the temperature of each monitoring point returns to the background temperature.

S3.2.3 Data quality check of DTS temperature measurement data in the first round of temperature measurement test. Check that the optical fiber data in the background temperature measurement stage, heating stage and cooling stage are complete and reliable in quality.

S3.2.4 Repeat S3.2.1, S3.2.2 and S3.2.3 and complete 2-3 heating tests.

S3.3 Post-experiment processing and data integration analysis

S3.3.1 Temperature data calibration of downhole temperature measuring unit and surface temperature measuring unit. Compare the data collected by downhole temperature measuring unit and surface temperature measuring unit with standard temperature data, adjust the deviation, and ensure that all temperature measurement data meet high accuracy and high reliability standards. The purpose of this step is to eliminate temperature measurement deviation caused by environmental factors, equipment errors or operating errors, and provide a reliable data for subsequent in-depth analysis.

S3.3.2 Analysis of downhole temperature-depth profiles during the heating and cooling phases. Analyze the temperature data during the heating phase, paying special attention to the change in temperature with depth, and the speed and intensity of the groundwater response to heating at different depths of the borehole. This can help identify differences in thermal conductivity and potential heterogeneity in the borehole. Cooling phase analysis: After heating is stopped, monitor how the temperature returns to its initial state over time and depth. Data analysis at this stage is critical for estimating groundwater flow velocity/rate.

(3) Groundwater Multi-Point Source Heat Plume Attenuation Data Processing and groundwater flow velocity estimation technology S4 Denoising Method for Groundwater Multi-Point Source Thermal Plume Attenuation Signal Data S4.1 Original signal data trimming and conversion S4.1.1 For the multi-point source heat plume attenuation signal data of the groundwater obtained in (2), first determine the depth range and depth interval of the valid data based on the defined apex and end point, and at the same time select an appropriate temperature data recording frequency based on research requirements, that is, determine the time interval for data recording.

S4.1.2 Use the defined depth range to segment the raw/original data and select the required temperature data according to the determined time interval. Assume that X is a given two-dimensional multi-point source heat/thermal plume attenuation signal data of the groundwater, the depth L range is [0, M], the time range T is [0, N], so the temperature data X is a two-dimensional array of shape N×M, $X=\{x_{i,j}\}$, $i\in\{1,2,\ldots,N\}$, $j\in\{1,2,\ldots,M\}$.

S4.1.3 Transpose the trimmed temperature data to obtain a two-dimensional array $X^T$ of shape M×N, $X^T=\{x_{i,j}\}$, $i\in\{1,2,\ldots,M\}$, $j\in\{1,2,\ldots,N\}$.

S4.2 Temperature data signal denoising

The distributed temperature data obtained from the experiment is subjected to noise removal. In order to streamline the data processing process and improve the efficiency of practical applications, the digital signal denoising method in this step is carried out using the scipy.signal module based on the Python language. The scipy.signal library is a professional tool for signal processing that supports many standard and commonly used signal processing techniques to help users convert and analyze time series data, audio signals, electrical signals or other physical signals. In addition to the above tools, the Signal Processing Toolbox in MATLAB is also a high-level language and interactive environment widely used in the field of signal processing. It also provides a wide range of preset functions and tools for designing filters, spectrum analysis, and transform analysis. Other signal denoising methods can also be used for this step.

S4.2.1 Determine the appropriate cut-off frequency

S4.2.2 Use a low-pass filter to perform low-pass filtering on the signal. The low-pass filter can retain low-frequency signals, that is, large-scale fluctuations in the data, while filtering out high-frequency signals, that is, fast and small-scale fluctuations in the data. Common low-pass filtering methods include moving average filters, exponential smoothing filters, Butterworth low-pass filters, and Chebyshev filters. Butterworth filter is a type of electronic filter, and it is also called a maximum flat filter. Its characteristics are that the frequency response curve in the passband is maximally flat, without ripples, and gradually decreases to zero in the stopband. On the Bode plot of the logarithm of the amplitude against the diagonal frequency, starting from a certain boundary angular frequency, the amplitude gradually decreases with the increase of the angular frequency and tends to negative infinity. For the Butterworth filter, the relationship between the amplitude and frequency of the n Butterworth low-pass filter can be expressed by the following formula:

$$|H(j\omega)| = \frac{1}{\sqrt{1+\left(\frac{\omega}{\omega_c}\right)^{2n}}}$$

$|H(j\omega)|$ is the amplitude of the frequency response; $\omega$ is the angular frequency; $\omega_c$ is the cutoff frequency, that is, the frequency point at which the filter begins to significantly attenuate the output signal; n is the order of the filter. The higher the order, the faster the filter attenuates near the cutoff frequency.

Next, we use the low-pass filter function butter in the scipy.signal module to design a Butterworth low-pass filter, and then pass it through the filtfilt function in the module to avoid introducing phase delay. The key parameters of the scipy.signal.butter function include N, Wn and btype. The N (int) parameter is the order of the filter, which determines the speed of the filter attenuation rate. The higher the order, the faster the filter attenuates near the cutoff frequency, but it may introduce more phase distortion. The Wn (array_like) parameter is an array of length 2, indicating the range of the cutoff frequency. The btype (str) defines the type of filter as a low-pass filter. The filter coefficients returned by the butter function are used in the filtfilt function. The designed filter is used to low-pass filter each column of temperature data along the column direction, smoothing the small fluctuations in the temperature data that changes with depth at different time intervals, retaining the real and effective temperature change signal.

Figure 2:
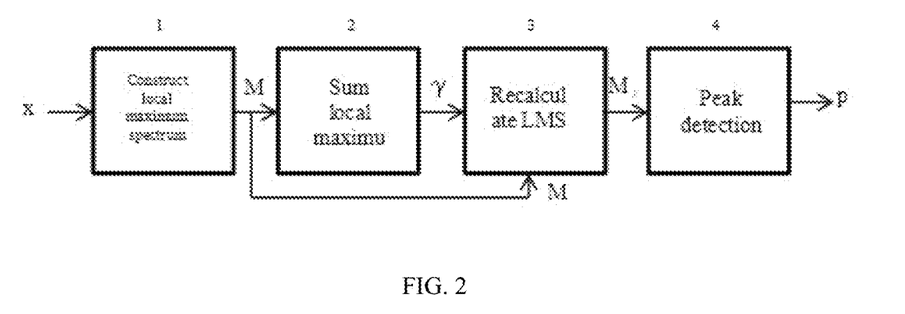
FIG. 2 is a flow chart of an AMPD algorithm according to an embodiment of the present disclosure.
Figure 3:
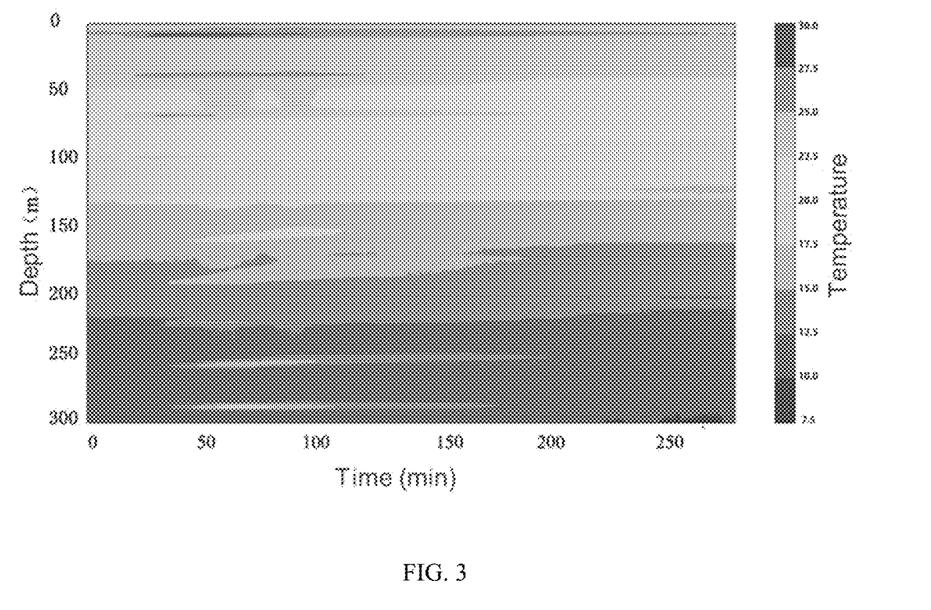
FIG. 3 is a temperature-depth curve obtained from a background temperature monitoring test in the method according to an embodiment of the present disclosure.
Figure 4:
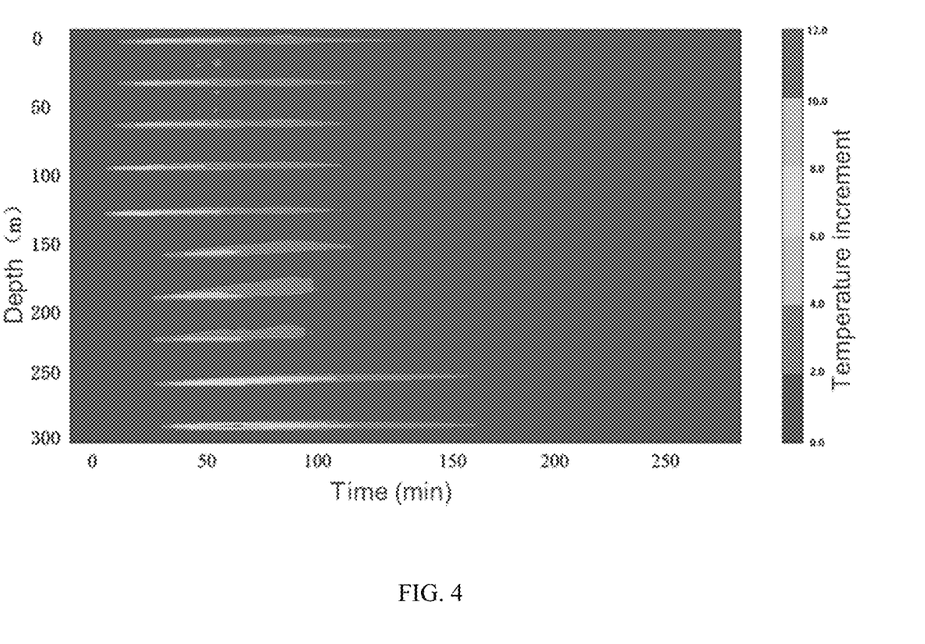
FIG. 4 shows formation and attenuation of thermal plume after noise reduction and background temperature removal.
Figure 5:
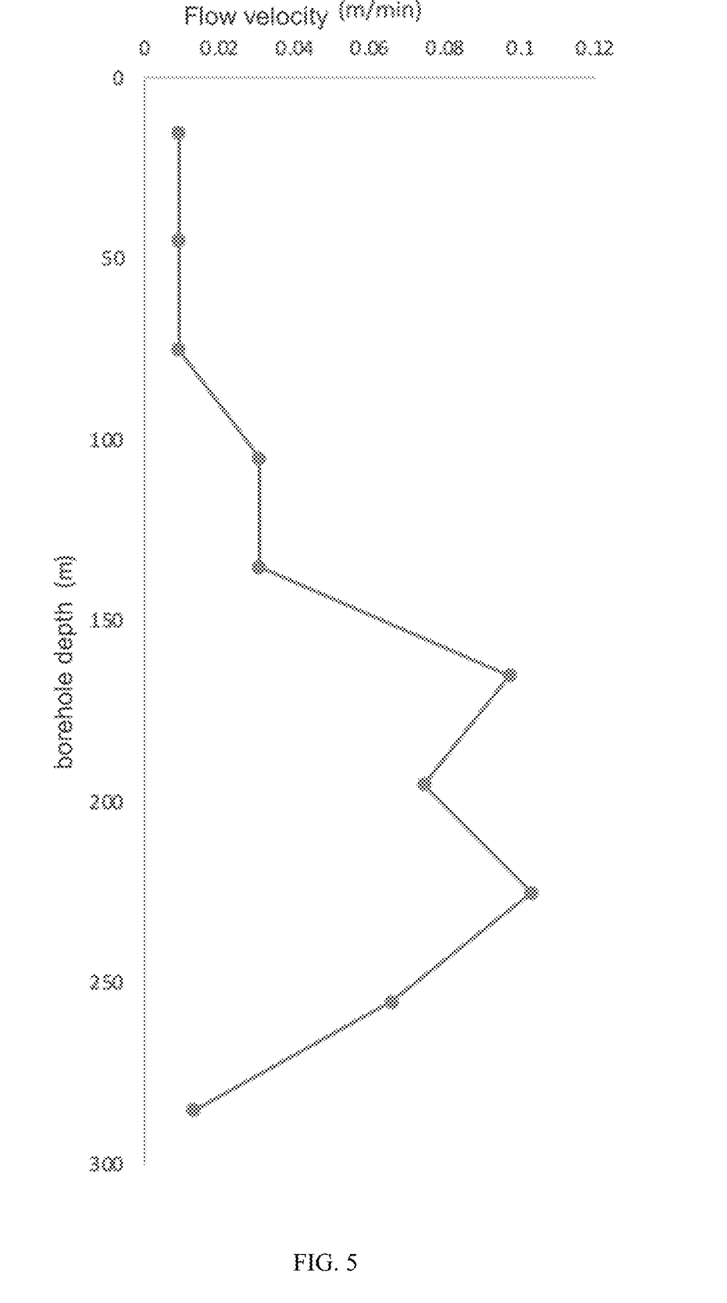
FIG. 5 is a diagram of groundwater flow velocities at various monitoring layers obtained according to the method of an embodiment of the present disclosure.

S5 Method for finding the peak value of temperature-permeability curve based on AMPD algorithm the AMPD algorithm (Automatic multiscale-based peak detection algorithm) is to decompose the signal into sub-signals of multiple scales and find the local maximum value at each scale. By comparing the local maximum values at different scales, the true peak position can be determined and the influence of noise can be eliminated. The steps of the AMPD algorithm are shown in FIG. 2.

S5.1 Constructing the local maximum spectrum (LMS): Assume x is a given univariate uniformly sampled signal containing a periodic or quasi-periodic peak. First, calculate the local maximum scan (LMS).

S5.1.1 First, remove the linear trend of the signal x and use the detrend function in the scipy.signal library to remove the linear trend of the original data.

S5.1.2 Use the moving window method to find the local maximum value of signal x. The window size $W_k$ varies as $\{W_k=2k|k=1,2,\ldots,L\}$, where k is the k-th window of the signal, $L=[N/2]-1$, where $[N/2]$ is the upper limit function, taking the smallest integer not less than N/2. The expression of the local maximum $m_{k,i}$ is as follows: it means that if x(t) is a local maximum in the k window at time t, then $m_{k,i}=0$; otherwise $m_{k,i}=r+\alpha$. Herein r is a uniformly distributed random number in the range [0,1], $\alpha$ is a constant factor ($\alpha=1$).

$$m_{k,i} = \begin{cases} 0, & x_{i-1} > x_{i-k-1} \wedge x_{i-1} > x_{i+k-1} \\ r+\alpha, & \text{otherwise} \end{cases}$$

S5.1.3 The calculation result M of $m_{k,i}$ is obtained, the matrix M is the local maximum spectrum (LMS), and all elements of the matrix M of shape L×N are within the range of [0,1+r].

$$M = \begin{pmatrix} m_{1,1} & m_{1,2} & \cdots & m_{1,N} \\ m_{2,1} & m_{2,2} & \cdots & m_{2,N} \\ \vdots & \vdots & \ddots & \vdots \\ m_{L,1} & m_{L,2} & \cdots & m_{L,N} \end{pmatrix} = (m_{k,i})$$

S5.2 Sum local maximum matrix

S5.2.1 Sum each column of the matrix M, that is, for each time point t, calculate the sum of its local maximum marks at all K scales. The global minimum $\lambda=\arg\min(\gamma_k)$ of $\gamma=[\gamma_1, \gamma_2, \ldots, \gamma_L]$ represents the window with the most local maxima. This will give a vector of the same length as the time series, where each element represents the total number of times each time point is marked as non-maximum at all scales.

$$\gamma_k = \sum_{i=1}^{N} m_{k,i}, \text{ for } k \in \{1, 2, \ldots, L\}$$

S5.2.2 Use the $\gamma$ value obtained in the previous step to recalculate the LMS matrix M, delete all elements in $m_{k,i}$ that statisfy $k>\lambda$, and obtain a new $\lambda\times N$ matrix $M_r=\{m_{k,i}\}$, $i\in\{1,2,\ldots,N\}$, $k\in\{1,2,\ldots,\lambda\}$.

S5.3 Calculate the peak position

The location of the peak can be determined by finding the location where the vector value in the previous step is 0. A vector value of 0 indicates that it is a local maximum at this time point at all considered scales and is therefore a global peak.

S5.3.1 Calculate column-wise standard deviation of the matrix $M_r$ $$\sigma_i = \frac{1}{\lambda-1}\sum_{k=1}^{\lambda}\left[\left(m_{k,i} - \frac{1}{\lambda}\sum_{k=1}^{\lambda}m_{k,i}\right)^2\right]^{\frac{1}{2}}, \text{ for } i \in \{1, 2, \ldots, N\}$$

S5.3.2 Find all indices i where $\sigma_i=0$; store these values in a vector $P=[P_1, P_2, \ldots, P_{\hat{N}}]$, where $\hat{N}$ is the total number of detected peaks of signal x and P is the index of the detected peaks.

S5.4 Temperature-permeability curve peak data search

S5.4.1 For all the data obtained by S4, change direction along the time interval t, for the temperature and depth data at a certain time point $t_i$, $i \in \{1,2,\ldots,N\}$, use the AMPD algorithm to search for the peak value, and obtain a vector $P_i=[P_1, P_2, \ldots, P_{\hat{M}}]_i$, where P is the index of the detected peaks, and the value of $\hat{M}$ is the number of measurement points;

S5.4.2 According to the obtained peak index $P_i$, multiply the corresponding index by the depth interval defined in S4.1.1 to obtain the depth data $r_i=[r_1, r_2, \ldots, r_{\hat{M}}]_i$ corresponding to the temperature peak point at a certain time point $t_i$, and store it in a one-dimensional array;

S5.4.3 Change direction along the time interval, use the AMPD algorithm to all the data, to obtain the three-dimensional data of the depth change of the temperature peak point at different times, let the data be a three-dimensional matrix R[t, p], t is the time, p is the measurement point corresponding to the temperature peak, $r_{i,j}$ is the depth data corresponding to p, $i \in \{1, 2, \ldots, N\}$, $j \in \{1,2,\ldots,\hat{M}\}$.

$$R = \begin{bmatrix} r_{11} & \cdots & r_{1\hat{M}} \\ \vdots & \ddots & \vdots \\ r_{N1} & \cdots & r_{N\hat{M}} \end{bmatrix} = \{r_{i,j}\}$$

S6 Peak Data Secondary Processing Method

According to the two-dimensional data of temperature variation over time at different depths obtained by S5, linear regression outlier analysis is performed on the temperature data at different depths, that is, outlier detection of linear data. Outliers can be directly judged by the absolute value of standardized residuals. Usually, if the absolute value of the residual is greater than 2 or 3, the sample point can be regarded as an outlier; the commonly used residual calculation methods are "standardized residuals" and "studentized residuals". Compared with standardized residuals, studentized residuals also remove the influence of high leverage values.

S6.1 Regression model fitting: Use ordinary least squares (OLS) and other methods to build a regression model for the temperature variation data at each depth over time. The OLS calculation process is as follows:

Assume there are data points $(x_1, y_1), (x_2, y_2), \ldots, (x_n, y_n)$, where $x_1$ is the independent variable and $y_1$ is the dependent variable. The linear model can be expressed as:

$$y = \beta_0 + \beta_1 1x$$

Here, $\beta_0$ and $\beta_1$ are the model parameters. The goal of ordinary least squares is to minimize the sum of squared errors, that is:

$$S = \sum_{n=1}^{n}(y_i - (\beta_0 + \beta_1 x_i))^2$$

By taking partial derivatives with respect to $\beta_0$ and $\beta_1$ and setting them to 0, the optimal estimates of the two parameters are obtained. The ols function provided in statsmodels.formula.api based on Python or MATLAB can be used as a calculation tool to implement the function of building a regression model using ordinary least squares method.

S6.2 Calculate the studentized residuals for the established regression model:

$$r_i = \frac{e_i}{s_e\sqrt{1-h_{ii}}};$$

where: $e_i$ is the residual of the i-th observation, i.e., $e_i=y_i-\hat{y}_i$; $s_e$ is the estimated standard deviation of the residual, $$\sqrt{\frac{\sum_{n=1}^{n} e_i}{n-p}},$$

where n is the sample size and p is the number of parameters in the model; $h_{ii}$ is the diagonal element of the hat matrix, reflecting the degree of influence of the i-th observation on its own predicted value.

Statsmodels.formula library used in the previous section is used, and the .get_influence ( ) method of the established OLS regression model is used to obtain the influence and leverage statistics of each input data, including the calculation of studentized residuals. Then we use the .resid_studentized_external method to obtain the calculation results of external studentized residuals.

S6.3 Outlier identification: Values greater than 2 or 3 in the studentized residual calculation results are considered as outliers, and the index of the data is recorded.

S6.4 Outlier processing: According to the index of the outlier identified in the previous step, assign the value corresponding to the index to a null value. Then use the linear interpolation formula to process the null value. The linear interpolation formula can be expressed as:

$$y = y_0 + \frac{(y_1 - y_0)}{(x_1 - x_0)} \cdot (x - x0)$$

Where: $x_1$, $x_0$ are the x-coordinates of the known point, $y_1$, $y_0$ are the y-coordinates of the known points, and x is the x-coordinate for which you want to estimate the corresponding y-value.

Taking SciPy library in MATLAB as an example, scipy.interpolate module is used to perform linear interpolation on null value data. After secondary processing, we obtain the depth variation data of the temperature peak points at different measurement points over time, a three-dimensional matrix $\hat{R}$[t, p], t is the time, p is the measurement point corresponding to the temperature peak, and $\hat{r}$ is the depth data corresponding to p, $t \in \{1,2,\ldots,i,\ldots,N\}$, $p \in \{1,2,\ldots,j,\ldots,\hat{M}\}$.

$$\hat{R} = \begin{bmatrix} \hat{r}_{11} & \cdots & \hat{r}_{1\hat{M}} \\ \vdots & \ddots & \vdots \\ \hat{r}_{N1} & \cdots & \hat{r}_{N\hat{M}} \end{bmatrix} = \{\hat{r}_{i,j}\}$$

S7 Groundwater velocity estimation technique:

For the matrix $\hat{R}$[t, p] obtained by S6.4, a one-dimensional linear regression model is established using the least squares method (OLS) for the two-dimensional data $p_j[t, \hat{r}]$ at a certain measurement point $P_j$.

Assume there are data points $(t_1, \hat{r}_1), (t_2, \hat{r}_2), \ldots, (t_n, \hat{r}_n)$, where t is the independent variable and $\hat{r}$ is the dependent variable. The linear model can be expressed as:

$$\hat{r} = \beta_0 + \beta_1 t$$

Here, $\beta_0$ and $\beta_1$ are the model parameters. The goal of ordinary least squares is to minimize the sum of squared errors, that is:

$$S = \sum_{n=1}^{n} (\hat{r}_i - (\beta_0 + \beta_1 t_i))^2$$

By taking partial derivatives with respect to $\beta_0$ and $\beta_1$ and setting them to 0, the optimal estimates of the two parameters are obtained. The function of building a regression model using ordinary least squares can be realized by using the ols function provided in Python language or MATLAB's statsmodels.formula.api as a calculation tool.

$\beta_1$ is the flow velocity at $p_j$, if its value is negative, then the flow velocity is upward, and if its value is positive, then the flow velocity is downward.

Cycle j to obtain the vertical velocity distribution of groundwater at different measuring points.

The beneficial technical effects of the present disclosure are:
1. The current single-point flow velocity and direction detection technology requires the detection device/probe to be placed in the wellbore, and it can only detect the groundwater velocity at a certain local point at a time. If it is necessary to detect the groundwater velocity at different depths or layers, it must lift or lower the probe to the target layer. Therefore, the spatiotemporal continuity of the measured data is poor, and the disturbance to the groundwater is large during the detection process, which increases the error of the measurement result. The present disclosure adopts distributed optical fiber temperature measurement technology and multi-point source active heating, composite optical cable, it can measure the vertical flow velocity of groundwater in wellbores of different layers at one time, greatly improving the efficiency and cost of groundwater flow velocity measurement. Since the vertical flow velocity of groundwater at multiple points in the wellbore can be measured at one time, the location of the water-conducting or water-blocking fracture and the horizontal groundwater flow velocity at different depths can also be inferred by the changes in the vertical flow velocity of groundwater at different depths.
2. Many velocity testing methods, such as tracer dilution method, involve the introduction of substances that are not originally in the groundwater into the aquifer, which may cause environmental pollution. The present disclosure uses temperature signals to analyze groundwater velocity. Temperature is one of the properties of groundwater itself. Using temperature as a tracer to carry out velocity measurement will not cause environmental pollution, but also it is very easy to measure. In particular, after the introduction of DTS, high-precision, high temporal and spatial resolution and long-term continuous monitoring of groundwater temperature has been achieved, greatly improving the efficiency and accuracy of velocity measurement. The optical fiber can also be fixed in the wellbore for a long time for long-term monitoring at different depths, which is impossible with other velocity testing methods.

Although the embodiments of the present disclosure have been shown and described, it will be appreciated by those skilled in the art that changes may be made to these embodiments without departing from the principles and spirit of the present disclosure. The scope of application of the present disclosure is defined by the appended claims and their equivalents.

What is claimed is:
1. A method for measuring flow velocity of multilayer groundwater using distributed optical fiber with point-source active heating, comprising:
Step S1: Setting and optimizing field test parameters;
Step S2: Conducting a background temperature monitoring test, comprising performing multiple rounds of temperature measurement tests; monitoring background temperature of a borehole along depth profile in each round of temperature measurement tests, with a monitoring time of more than 24 hours; and performing a quality check on the temperature measurement test data after each round of temperature measurement tests;
Step S3: Performing a point-source active heating distributed temperature measurement test, comprising performing multiple rounds of heating tests; in each round of heating tests, controlling a heating device controller to turn on each electric heating unit for a predetermined time, so that the temperature of each groundwater monitoring point rises to a predetermined temperature value, then turning off each electric heating unit; and stopping monitoring when the temperature of each groundwater monitoring point returns to the background temperature; and performing a quality check on the temperature measurement test data after each round of heating tests;
Step S4: Denoising multipoint-source thermal plume attenuation signal data of the groundwater obtained in Step 3;
S4.1 Original signal data trimming and conversion, comprising
S4.1.1 For the obtained multipoint-source thermal plume attenuation signal data of the groundwater, determine a depth range and depth interval of valid data based on a defined apex and end point, and, select an appropriate temperature data recording frequency and determine a time interval for data recording;
S4.1.2 Use the determined depth range to segment the original data, and select and obtain the required temperature data according to the determined time interval; such that X is a given two-dimensional multi-point source thermal plume attenuation signal data of the groundwater, with a depth range L of [0, M], a time range T of [0, N], then the temperature data X is a two-dimensional array of shape N×M, $X=\{x_{i,j}\}$, $i \in \{1, 2, \ldots, N\}$, $j \in \{1, 2, \ldots, M\}$;
S4.1.3 Perform a transposition operation on trimmed temperature data to obtain a two-dimensional array $X^T$ of shape M×N, $X^T=\{x_{i,j}\}$, $i \in \{1, 2, \ldots, M\}$, $j \in \{1, 2, \ldots, N\}$;
S4.2 Temperature data signal denoising, comprising
S4.2.1 Determine an appropriate cutoff frequency;
S4.2.2 Use a low-pass filter to perform low-pass filtering on the signal, wherein the low-pass filter retains low-frequency signals, that is, large-scale fluctuations in the data, and filters out high-frequency signals, that is, fast and small-scale fluctuations in the data; wherein low-pass filtering methods comprise moving average filters, exponential smoothing filters, Butterworth low-pass filters, and Chebyshev filters; for Butterworth filters, a relationship between amplitude and frequency of a nButterworth low-pass filter is expressed by the following formula:

$$|H(j\omega)| = \frac{1}{\sqrt{1 + \left(\frac{\omega}{\omega_c}\right)^{2n}}},$$

where $|H(j\omega)|$ is amplitude of frequency response; $\omega$ is angular frequency; $\omega_c$ is cutoff frequency, which is a frequency point at which the filter begins to significantly attenuate the output signal; n is the order of the filter, the higher the order, the faster the filter attenuates near the cutoff frequency;

Step S5: Searching for a peak value of temperature-permeability curve based on an automatic multiscale-based peak detection algorithm, comprising S5.1 Construct a local maximum spectrum: assuming such that x is a given univariate uniformly sampled signal containing a periodic or quasi-periodic peak; then first calculate the local maximum scan map;

S5.1.1 Remove linear trend data from the signal x;

S5.1.2 using a moving window method to find the local maximum value of signal x, the window size $W_k$ varies as $\{W_k=2k|k=1,2, \ldots, L\}$, where k is the k-th window of the signal, $L=[N/2]-1$, where $[N/2]$ is the upper limit function, taking the smallest integer not less than N/2; the expression of the local maximum $m_{k,i}$ is as follows:

$$m_{k,i} = \begin{cases} 0, & x_{i-1} > x_{i-k-1} \wedge x_{i-1} > x_{i+k-1} \\ r + \alpha, & \text{otherwise} \end{cases}$$

wherein $x_{j-k-1} \wedge x_{j-1}$ is the wedge product of $x_{j-k-1}$ and $x_{j-1}$; such that, if x(t) is the local maximum value in the k window at time t, then $m_{k,i}=0$; otherwise $m_{k,i}=r+\alpha$; where r is a uniformly distributed random number in a range [0,1], and $\alpha$ is a constant factor ($\alpha=1$);

S5.1.3 Obtain a calculation result M of $m_{k,i}$, the matrix M is the local maximum spectrum (LMS), and all elements of the matrix M of shape L×N are within the range of [0,1+r];

$$M = \begin{pmatrix} m_{1,1} & m_{1,2} & \cdots & m_{1,N} \\ m_{2,1} & m_{2,2} & \cdots & m_{2,N} \\ \vdots & \vdots & \ddots & \vdots \\ m_{L,1} & m_{L,2} & \cdots & m_{L,N} \end{pmatrix} = (m_{k,i}),$$

S5.2 Sum the local maximum matrix, comprising

S5.2.1 Sum each column of the matrix M, that is, for each time point t, calculate the sum of its local maximum marks at all K scales; the global minimum $\lambda=\text{argmin}$ ($\gamma_k$) of $\gamma=[\gamma_1, \gamma_2, \ldots, \gamma_L]$ represents the window with the most local maximum values; it gives a vector of the same length as the time series, in which each element represents the total number of times each time point is marked as non-maximum at all scales;

$$\gamma_k = \sum_{i=1}^{N} m_{k,i}, \text{ for } k \in \{1, 2, \ldots, L\};$$

S5.2.2 Use the $\gamma$ value obtained in the previous step to recalculate the LMS matrix M, delete all elements in $m_{k,i}$ that statisfy k>$\lambda$, and obtain a new $\lambda$×N matrix $M_r=\{m_{k,i}\}$, i∈{1,2, . . . , N}, k∈{1,2, . . . , $\lambda$};

S5.3 Calculate peak position, comprising
the location of the peak is determined by finding the location where the vector value is 0 in the previous step;

S5.3.1 Calculate the column-wise standard deviation of the matrix $M_r$;

$$\sigma_i = \frac{1}{\lambda - 1} \sum_{k=1}^{\lambda} \left[ \left( m_{k,i} - \frac{1}{\lambda} \sum_{k=1}^{\lambda} m_{k,i} \right)^2 \right]^{\frac{1}{2}}, \text{ for } i \in \{1, 2, \ldots, N\};$$

S5.3.2 Find all indices i where $\sigma_i=0$; store these values in a vector $P=[P_1, P_2, \ldots, P_{\hat{N}}]$, where $\hat{N}$ is the total number of detected peaks of signal x and P is the index of the detected peaks;

S5.4 Temperature-permeability curve peak data search, comprising

S5.4.1 For all the data obtained by S4, change direction along the time interval t, for the temperature and depth data at a certain time point $t_i$, i∈{1,2, . . . , N}, use an Automatic multiscale-based peak detection (AMPD) algorithm to search for the peak value, and obtain a vector $P_i=[P_1, P_2, \ldots, P_{\hat{M}}]_i$, where P is the index of the detected peaks, and the value of $\hat{M}$ is the number of measurement points;

S5.4.2 According to the obtained peak index $P_i$, multiply the corresponding index by the depth interval defined in S4.1.1 to obtain the depth data $r_i=[r_1, r_2, \ldots, r_{\hat{M}}]_i$ corresponding to the temperature peak point at a certain time point $t_i$, and store it in a one-dimensional array;

S5.4.3 Change direction along the time interval, use the AMPD algorithm to all the data, to obtain the three-dimensional data of the depth change of the temperature peak point at different times, let the data be a three-dimensional matrix R[t, p], t is the time, p is the measurement point corresponding to the temperature peak, $r_{i,j}$ is the depth data corresponding to p, i∈{1,2, . . . , N}, j∈{1,2, . . . , $\hat{M}$};

$$R = \begin{bmatrix} r_{11} & \cdots & r_{1\hat{M}} \\ \vdots & \ddots & \vdots \\ r_{N1} & \cdots & r_{N\hat{M}} \end{bmatrix} = \{r_{i,j}\};$$

Step S6: Performing secondary processing on the peak data, comprising based on the two-dimensional data of temperature variation over time at different depths obtained by S5, perform linear regression outlier analysis on the temperature data at different depths and outlier detection of linear data;

S6.1 Regression model fitting: use ordinary least squares (OLS) to build a regression model for the temperature variation data at each depth over time; the OLS calculation process is as follows:

wherein there are data points $(x_1, y_1), (x_2, y_2), \ldots, (x_n, y_n)$, where $x_1$ is an independent variable and $y_1$ is a dependent variable; the linear model is expressed as:

$$y = \beta_0 + \beta_1 x;$$

wherein $\beta_0$ and $\beta_1$ are model parameters; the goal of ordinary least squares is to minimize the sum of squared errors, that is:

$$S = \sum_{n=1}^{n} (y_i - (\beta_0 + \beta_1 x_i))^2;$$

by taking partial derivatives with respect to $\beta_0$ and $\beta_1$ and setting them to 0, the optimal estimates of the two parameters are obtained;

S6.2 Calculate the studentized residuals for the established regression model:

$$r_i = \frac{e_i}{s_e\sqrt{1-h_{ii}}};$$

where: $e_i$ is the residual of the i-th observation, that is, $e_i = y_i - \hat{y}_i$; $s_e$ is the estimated standard deviation of the residual, $$\sqrt{\frac{\sum_{n=1}^{n} e_i}{n-p}},$$

where n is the sample size and p is the number of parameters in the model; $h_{ii}$ is the diagonal element of the hat matrix, reflecting the degree of influence of the i-th observation on its own predicted value;

S6.3 Outlier Identification: Values greater than 2 or 3 in the studentized residual calculation results are considered as outliers and the index of the data is recorded;

S6.4 Outlier processing: According to the index of the outliers identified in the previous step, assign a null value to the value corresponding to the index; then use a linear interpolation formula to process the null value, the linear interpolation formula is expressed as:

$$y = y_0 + \frac{(y_1 - y_0)}{(x_1 - x_0)} \cdot (x - x_0);$$

where: $x_1$, $x_0$ are the x-coordinates of the known points, $y_1$, $y_0$ are the y-coordinates of the known points, and x is the x-coordinate of the corresponding y-value you want to estimate;

after secondary processing, the depth variation data of the temperature peak points at different measurement points over time are obtained, a three-dimensional matrix $\hat{R}[t, p]$, t is the time, p is the measurement point corresponding to the temperature peak, and $\hat{r}$ is the depth data corresponding to p, $t \in \{1, 2, \ldots, i, \ldots, N\}$, $p \in \{1, 2, \ldots, j, \ldots, \hat{M}\}$;

$$\hat{R} = \begin{bmatrix} \hat{r}_{11} & \cdots & \hat{r}_{1\hat{M}} \\ \vdots & \ddots & \vdots \\ \hat{r}_{N1} & \cdots & \hat{r}_{N\hat{M}} \end{bmatrix} = \{\hat{r}_{i,j}\};$$

Step S7: Estimating the groundwater flow velocity, using the ordinary least squares method to establish a one-dimensional linear regression model for the temperature variation data at each depth over time, and obtaining the estimated value of the groundwater flow velocity at the depth from the fitted regression model equation;

for the matrix $\hat{R}[t, p]$ obtained by S6.4, a one-dimensional linear regression model is established using the least squares method (OLS) for the two-dimensional data $p_j[t, \hat{r}]$ at a certain measurement point $p_j$;

wherein, for data points $(t_1, \hat{r}_1), (t_2, \hat{r}_2), \ldots, (t_n, \hat{r}_n)$, where t is the independent variable and $\hat{r}$ is the dependent variable; the linear model is expressed as:

$$\hat{r} = \beta_0 + \beta_1 t;$$

where $\beta_0$ and $\beta_1$ are model parameters; the goal of ordinary least squares is to minimize the sum of squared errors, that is:

$$S = \sum_{n=1}^{n} (\hat{r}_i - (\beta_0 + \beta_1 t_i))^2;$$

by taking partial derivatives with respect to $\beta_0$ and $\beta_1$ and setting them to 0, the optimal estimates of the two parameters are obtained;

wherein $\beta_1$ is the flow velocity at $p_j$, wherein, if its value is negative, then the flow velocity is upward, and if its value is positive, then the flow velocity is downward;

Cycle j to obtain the vertical velocity distribution of groundwater at different measuring points;

wherein step S1 comprises:

analyzing physical parameters of the borehole and core, comprising lithology distribution, thermal conductivity, porosity, specific heat capacity and permeability;

setting and optimizing parameters of a distributed optical fiber temperature measurement host;

wherein the step of setting and optimizing parameters of a distributed optical fiber temperature measurement host comprises:

setting a monitoring length and heating point position of a temperature measuring optical fiber, and calibrating optical fiber refractive index parameters through a first water bath temperature calibration unit and a second water bath temperature calibration unit;

testing a monitoring temperature resolution and temperature accuracy of the distributed optical fiber temperature measurement host, and calibrating and optimizing optical fiber attenuation coefficient, temperature sensitivity coefficient and temperature compensation value of the distributed optical fiber temperature measurement host through the first water bath temperature calibration unit and the second water bath temperature calibration unit;

performing test in borehole groundwater, and setting maximum temperature, duration, and power of the heating based on expected temperature response and safety criteria.

2. The method according to claim 1, wherein,
after the background temperature monitoring test, all collected temperature data are corrected to ensure that the temperature measurement results at different depths and locations are coordinated with each other, and a background temperature-depth profile is produced to provide basic data for subsequent active heating distributed temperature measurement experiments.

3. The method according to claim 1, wherein,
after the point-source active heating distributed temperature measurement test, the data collected by a downhole temperature measurement unit and a surface temperature measurement unit are compared with the standard temperature data, the deviation is adjusted, and the temperature data in the heating stage and the temperature data in the cooling stage are analyzed.

4. The method according to claim 1, wherein step S4 comprises:
trimming and conversing the multi-point source thermal plume attenuation signal data of the groundwater;
denoising the distributed temperature data obtained from the test.

5. The method according to claim 1, wherein step S5 comprises:
construct the local maximum spectrum;
sum the local maximum matrix and calculate the peak position of the temperature-permeability curve.

6. The method according to claim 1, wherein step S6 comprises:
Regression model fitting: using ordinary least squares method to build a regression model for the temperature variation data at each depth over time;
Calculating the studentized residuals for the established regression model;
Outlier identification: values greater than 2 or 3 in the studentized residual calculation results are considered as outliers, and the index of the data is recorded;
Outlier processing: according to the index of the identified outlier, the value corresponding to the index is assigned a null value, and then the null value is processed using a linear interpolation formula to obtain the temperature variation data over time at the depth corresponding to the peak temperature completed by the secondary processing.

7. The method according to claim 1, wherein,
the method adopts a point-source active heating, composite optical cable, groundwater distributed optical fiber temperature measurement system.

* * * * *